J. F. LIGHT.
Modes of Lubricating Journal-Boxes.
Reissued May 26, 1874.
No. 5,891.
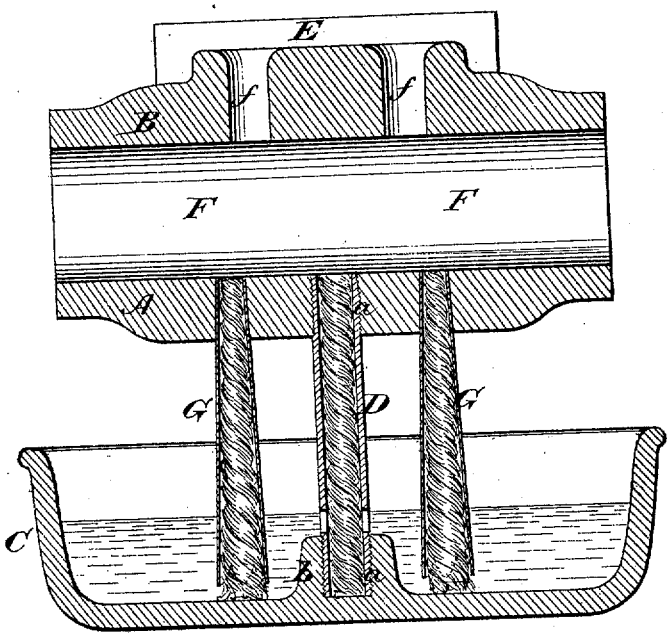
Witnesses.
C. F. Brown.
Dr. K. Ellsworth.
Inventor
J. F. Light.
by his Attys
Hill & Ellsworth
AM. PHOTO-LITHOGRAPHIC Co. N.Y. (OSBORNE'S PROCESS.)

UNITED STATES PATENT OFFICE.

JOSEPH F. LIGHT, OF WORCESTER, MASS., ASSIGNOR TO SIMEON S. COOK.

IMPROVEMENT IN THE MODES OF LUBRICATING JOURNAL-BOXES.

Specification forming part of Letters Patent No. 50,143, dated September 26, 1865; reissue No. 5,891, dated May 26, 1874; application filed March 7, 1874.

*To all whom it may concern:*

Be it known that I, JOSEPH F. LIGHT, of the city and county of Worcester and State of Massachusetts, have invented certain new and useful Improvements in Devices for Oiling Journal-Boxes; and I do hereby declare the following to be a full and exact description of the same, reference being had to the accompanying drawings forming a part of this specification.

The drawings represent a longitudinal section of a journal-box with my improvements applied thereto, A representing the lower half of the box, and B the upper half. C is the drip-cup, which is attached to the part A by the tubular stem D, which has a screw-thread, *a*, cut on each end. The lower end of D screws into a hole in the projection *b* in cup C, and through the lower end of tube D holes are formed to permit the oil to communicate freely with the tube D. G G are supplementary tubes secured to the lower half of the box A, and reaching nearly to the bottom of cup C. *f f* are oil-holes formed through the upper portion B. E is the upper part of the projection by which the box is secured to the hanger or other means of support. The tubes D D G are provided with wicks or other suitable porous material, extending downward from the journal-bearing to the drip-cup.

The operation is as follows: The journal rotates in the space F F, and may be lubricated by turning oil or other suitable lubricating matter into the orifices *f f*, or by filling the oil-cup G to a suitable depth. If filled through the orifices *f f*, the surplus, should there be any, will be caught by the drip-cup C, from which it will be taken up by the porous material in the tubes D G and G against the journal, when it is forced laterally each way from the tubes along the journal-bearing. The surplus running from the ends and being caught by the drip-cup C, is again elevated to the journal, and repeats the process so long as the journal revolves.

It will be observed that the lubricating compound is well filtered before it passes to the journal, and, consequently, no dirt or grit is allowed to reach the journal with the lubricating compound; hence journals with my oiling devices attached always present an even smooth appearance. When the wicks become clogged by any dirt, dust, or obstructions whatever, they may be easily removed to be cleaned, or for the substitution of a new wick, by removing the drip-cup C, which affords access to both ends of the tubes, so the wicks can be drawn through and the tubes cleaned.

The invention can be easily applied to old journal-boxes, no matter how the drip-cup is supported, all that is necessary being to drill a hole in the lower portion of the journal-box and insert a tube similar to G, provided with a wick extending downward from the journal-bearing to the drip-cup.

Two forces operate to elevate or draw the lubricator from the drip-cup or reservoir to the journal-bearing, viz., capillary attraction, and the pressure of the atmosphere upon the oil in the drip-cup or reservoir, forcing the oil upward to fill the partial vacuum caused by the rotation of the shaft by or across the end of the tube or tubes attached to the journal-box or bearing.

The rapidity with which the oil or lubricator is supplied to the journal may be reguted by the compactness with which the wick is pressed or forced into the tube. If the wick be pressed in hard and compact the supply of oil to the journal will be much slower than when the wick is put in loosely. The supply may be also varied by the number of tubes operating, and wicks may be used in either one, or any two, or all three of the tubes.

Having thus described my improved device for oiling journal boxes or bearings, what I claim as new and of my invention, is—

1. The combination of a pendent oil-receptacle with the lower half of a journal-box, said receptacle supplying oil to the journal and catching the drip therefrom, and also removable without disturbance of the bearing, substantially as described, and for the purposes set forth.

2. The oil-receptacle, constructed as described, and connected with the journal-box by a tube or tubes, substantially as described, and for the purposes set forth.

3. The combination, with the box of a journal or bearing, of the tube or tubes, and wick or wicks, substantially as and for the purposes set forth.

4. The combination, with the oil-reservoir and lower half of a journal box or bearing, of a hollow supporting-stem and wick, as set forth.

In testimony of which invention I hereunto set my hand.

JOSEPH F. LIGHT.

Witnesses:

JOSEPH WHITAKER,
EDWARD F. LIGHT.